2,808,622

METHOD OF MANUFACTURING NYLON ARTICLES HAVING IMPROVED DIMENSIONAL STABILITY

Louis L. Stott, Wyomissing, and William J. Davis, West Reading, Pa., assignors to The Polymer Corporation, Reading, Pa., a corporation of Pennsylvania Application September 23, 1955, Serial No. 536,319

7 Claims. (Cl. 18—47.5)

This invention relates to the manufacture of articles from polyhexamethylene adipamide, one of the best known of the polyamides or nylon materials.

The invention is especially concerned with certain production techniques adapted to greatly enhance the dimensional stability of articles made from this polyamide.

Fabrication of such articles with accurate dimensions and with dimensional stability has been a problem because of certain characteristics of the polyamide, and the attainment of accuracy and stability has been particularly difficult in articles or parts of substantial sectional dimension, for instance rings, gears, etc. In considering the reasons for the problems and the difficulties encountered, it is mentioned that the molding of articles from polyhexamethylene adipamide, especially where the article is of substantial sectional dimension, frequently has a tendency to set up a rather erratic condition of internal strain, which tends to distort the article, especially where a part is machined from molded slab or rod stock or the like.

In addition, this polyamide tends to absorb a certain amount of moisture, such absorption requiring considerable time when the article is merely left standing or stored under normal atmospheric conditions, with the result that dimensional growth occurs, thereby altering the initial dimensions of the article or machined part.

The present invention contemplates certain treatment steps, preferably applied in a specific sequence, in order to enhance dimensional stability in such polyamide articles.

Figure 1:
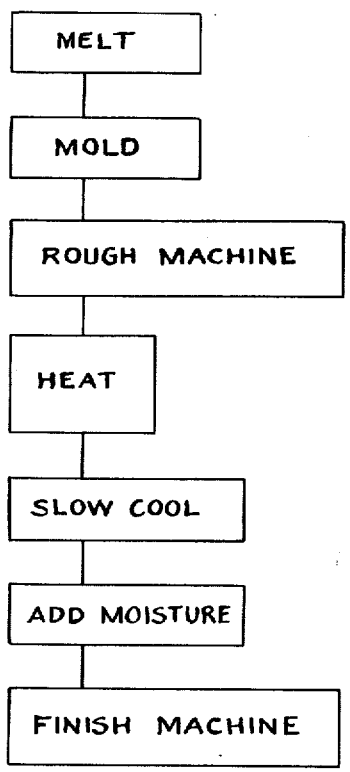
Figure 2:
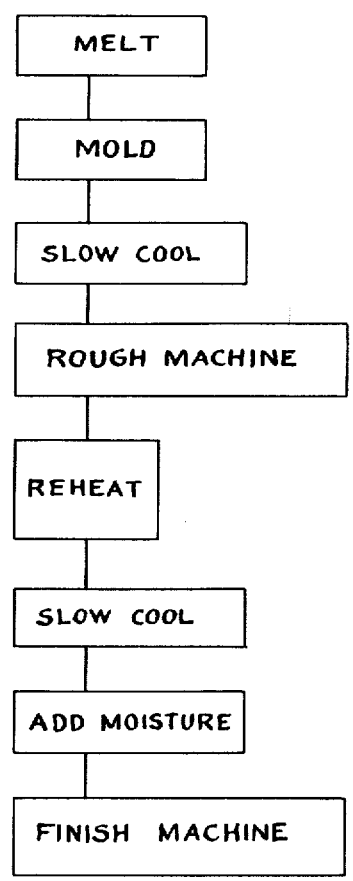

In the drawing, Figures 1 and 2 are block or flow diagrams representative of certain treatments contemplated by the invention.

In considering the techniques of the invention it is first pointed out that the raw polyamide material is commercially available in flake or granular form. The flake or granular material is melted and then subjected to some type of molding operation in order to form the desired article, which may either comprise a finished or substantially finished article, a rough blank adapted for machining or the like, or rod, slab or cylindrical stock from which desired articles may be cut or machined. Such machining is sometimes effected in a plurality of stages, including for instance an initial rough machining operation, and a final finish machining operation. The molding operations may comprise pressure molding, injection molding, extrusion, centrifugal casting, or the like.

It is advantageous in these molding operations, in general, to dry the flake or granular material prior to the melting and molding steps, since articles and pieces of improved characteristics are thereby obtained. However, since the polyamide tends to absorb moisture over a period of time which is more or less extended depending upon the sectional dimension of the piece, if articles are machined promptly after molding, the dimensions will change in course of time along with the absorption of moisture. The invention contemplates special treatment to accelerate the absorption of moisture and further contemplates effecting at least finish machining operations subsequent to the increase in moisture content.

Additionally the invention provides a treatment by heating to a certain temperature range, followed by slow cooling, as will further appear, in order to relieve internal strain, and this heating is effected in a certain sequence with respect to the treatment to increase the moisture content, and also with respect to machining operations, if used, for reasons which will be explained.

In a typical operation, for instance in the manufacture of a ring, a cylindrical piece may first be formed, as by centrifugal casting, such cylinder being, for example, 4½" inside diameter and 5" outside diameter. The cylinder may be 12" or more in length. In casting this cylinder the flake or granular material is preferably initially dried to a moisture content below about 0.2% by weight. This dried material is then melted and centrifugally cast, for instance by the technique disclosed in copending application of Louis L. Stott, Serial No. 166,790, filed June 8, 1950, now abandoned. Following casting of the cylinder, a ring may be cut therefrom, such a cutting operation comprising in effect a rough machining. The rough ring is then heated in an oil bath in which its temperature is gradually brought up to a point within the range from 450° to 475° F. After attaining the desired temperature or following a short interval at such temperature, the ring is slowly cooled, for instance by gradual cooling of the oil bath over a time of two or three hours down to a temperature approximating or just below the boiling point of water, for instance 200° F. This heating and slow cooling acts to relieve internal strain, thereby minimizing tendency for the ring to warp or distort.

Following the foregoing treatment the ring is treated to cause it to absorb moisture, advantageously by boiling in water, this boiling being continued for a greater or lesser time, depending upon the sectional dimension of the ring, in order to raise the moisture content of the ring, well above 0.2% to which the material was initially dried. Desirably the moisture content is increased to several percent.

With regard to the increase in moisture content, it may be noted that polyhexamethylene adipamide when left standing under ordinary atmospheric conditions will gradually establish an equilibrium condition with respect to moisture content, the percentage of retained water at this equilibrium point being usually between 2% and 3% under average conditions of humidity for the temperate climate. However, in the case of a polyamide article of any substantial section molded from previously dried polyamide, great time is required for the article to absorb sufficient moisture when standing under normal atmospheric conditions to attain the 2% to 3% representing (approximately) the equilibrium condition. Boiling in water greatly accelerates the absorption of moisture and in this way the moisture content is brought up to a point approaching the natural or equilibrium content which the piece would gradually attain from extended exposure to normal atmospheric conditions.

The ring is then subjected to the finish machining operation, for instance accurate machining of inside and outside diameters. A ring prepared in accordance with the foregoing is characterized by an exceptional degree of dimensional stability and accuracy.

In the illustrative example referred to above, the following treatment steps were mentioned, these being illustrated in Figure 1 of the drawing. First, the flake or granular polyamide was dried. It was then melted and centrifugally cast. After this the article being formed (the ring) was cut from the cylinder. The ring was then heated and thereafter slowly cooled; and this treatment was followed by increasing the moisture content. As a final step the finish machining was applied.

It is to be understood that certain features or steps of the method are of value in situations where not all of the foregoing treatments are applied and also in situations where certain of the treatment steps occur in an altered sequence. Thus, for example, it is quite practical for many purposes to subject the initially molded piece to heating and slow cooling prior to the rough machining of an article therefrom. It is still further possible to apply the rough machining at a stage in the manufacture of an article even following the treatment to increase the moisture content.

Wherever the heating and slow cooling (to relieve internal strain) and the moisture treatment are utilized, it is of importance that the moisture treatment be applied after the treatment to relieve the internal strain. The reason for this is that the treatment to relieve strain requires heating to a temperature well above the boiling point of water, and if an appreciable quantity of moisture is present in the piece during such heating, a tendency is set up to damage the piece, as by blistering the surface thereof, due to volatilization of the moisture. However, for certain purposes each of these two treatments (the heating followed by slow cooling, and the moisture treatment) may be used independently, depending from the particular type of piece being made and whether or not various forms of machining operations are to be used.

In carrying out various of the operations or steps of the invention, variations in treatment temperatures or other conditions are permissible, for instance within ranges such as those indicated herebelow.

It is first noted that the treatment of the present invention is especially applicable to the nylon material—polyhexamethylene adipamide, although it is to be understood that this material may be modified somewhat by the presence of certain other constituents such, for example, as pigments, for instance titanium dioxide, fillers, for instance, graphite, and other modifiers, anti-oxidants or the like added for other purposes.

First, with reference to the drying of the flake or granular material prior to molding, it is possible to mold pieces with as much as about 0.5% moisture content by weight, although it is preferred to reduce the moisture content at least down to about 0.2%. Such drying is advantageously done under vacuum conditions, with the flake or granular material heated.

As already indicated variations in molding techniques include for instance pressure molding of rods or the like, for example as disclosed in patent of Louis L. Stott, No. 2,505,807, issued May 2, 1950. The initial formation of the piece may also be done by centrifugal casting, for instance as described in the copending application identified above. Injection molding and even extrusion may also be employed for some purposes.

In heating to relieve internal strain it is highly desirable to adopt a non-oxidizing condition, advantageously by treatment in an oil bath, the temperature of the oil being gradually raised to the desired value, in order to avoid localized overheating of the piece. The rate of heating of the piece will depend in large part upon the sectional dimension of the item, the greater the sectional dimension the lower the rate, since with larger sections, greater time is required for heat penetration. Uniformity of heating throughout the piece is important, as it is desirable to have all portions of the piece attain the treating temperature. Moreover, after reaching the proper heat this treating temperature should preferably be maintained on the piece, at least for a short interval of time, for instance a time of at least 10 minutes, i. e., all portions of the piece should remain at a temperature above the effective minimum for the time indicated, although it is not essential that the piece remain at an exact temperature within the temperature range for any given period of time. The temperature range for this treatment is from 400° F. to 500° F., most advantageously between 450° F. and 475° F.

The cooling of the piece from this treating temperature should be sufficiently slow to avoid redevelopment of strain, which may result from cooling at such a rapid rate as to bring down the temperature of the surface layers of the piece much more rapidly than the interior parts thereof. This rate of cooling will again depend upon the sectional dimension of the piece, i. e., the depth of material through which heat transfer must be effected. Although thin sections, such as pieces up to about ¼" thickness, can often be cooled in air it is necessary to cool heavy sections more slowly. This may advantageously be done by slow cooling of the oil bath in which the pieces were heated. Thus, pieces of 1½" or more diameter usually take cooling periods of three hours or more to exhibit a strain-free condition, and even pieces of ⅝" diameter are preferably cooled over a period of at least 30 minutes.

Another general guide with reference to the rate of cooling of pieces of any particular section may be set up by observing the approximate time required for heating the piece uniformly up to the treating temperature. Thus, the cooling rate should be at least as low as that required to heat the piece uniformly through the same temperature range. The extent of cooling should bring down the temperature of the piece substantially uniformly at least to a value approximating the boiling point of water and preferably somewhat below, for instance down to 200° F.

The cooling is also advantageously done in an oil bath, which may be the same bath used for heating, the rate of cooling being controlled by gradually diminishing the heat applied to the bath. However, in some cases, for instance where pieces of small sectional dimension are being treated, merely standing in air will suffice, as is above mentioned.

Increasing the moisture content may be accomplished in several different ways, as by steaming or boiling in water. Water boiling is particularly advantageous since the boiling constitutes an effective way of accurately controlling the temperature of all parts of the piece during moisture absorption. This treatment is carried on long enough to raise the moisture content appreciably above the initial dried condition, i. e., appreciably above 0.2%.

Under ideal conditions the moisture content would be brought to the percentage representing an average equilibrium condition, i. e., about 2½%, and ideally the moisture distribution would be uniform throughout the mass of the article. Such ideal is difficult to attain within a reasonable time because the rate of moisture absorption even in boiling water is not very high especially where the sectional dimension is large. For example, with a rod of ½" diameter, about 7 to 10 hours' boiling is required to raise the total moisture content to about 2½%. The required time progressively and sharply increases with increase in the sectional dimension of the article, so that with articles of very large section, for example of about 1", upwards of about 50 hours' boiling is needed to attain 2½% moisture. On the other hand, with pieces of relatively small section the boiling time required is much lower. Indeed, only about 1 hour is needed with a rod of about ⅛" diameter.

While the foregoing times are relatively long, nevertheless they are very much shorter than are required to attain 2½% moisture where the piece is merely permitted stand under normal atmospheric conditions. When standing in the atmosphere under average conditions of humidity for the temperate climate, pieces having a sectional dimension of the order of about ½" may require considerably longer than 6 months to take up 2½% moisture.

In view of the foregoing with pieces of relatively large section, for instance upwards of about 1", it is not always practical to bring the moisture content to as high as 2½%, but definite benefit is gained by any appreciable increase in moisture above the initial dried condition, i. e., about 0.2%.

However, with pieces of relatively small cross sectional dimension, for instance smaller than about ½" it is contemplated that the boiling be carried to at least as far as 2½%, and advantageously beyond this figure, for instance up to 4% or 5%. In such case, after the boiling the piece or article is desirably dried again down to a total moisture content of about 2½%. The purpose of raising the content to a value above the equilibrium percentage (2½%) and then again lowering the percentage approximately to the equilibrium avlue is explained just below.

The boiling of an article leaves the article in a condition in which the surface layers thereof have a much higher moisture content than does the interior, so that where the total moisture content has been taken up to 5%, the surface layers may have a considerably higher content than 5%, and the interior considerably lower than 5%. It has been found, however, that if the total moisture content be carried well beyond the natural 2½% figure, and this total content be thereafter reduced by drying down to about 2½%, the difference in moisture content as between the surface layers and the interior is greatly reduced, so that the piece then has a distribution of moisture approximating that attained by natural moisture absorption.

In reducing the moisture content again approximately to the natural or equilibrium percentage the piece may be heated in warm air, for instance in an oven maintained at a temperature of from 120° F. to 175° F. The length of time required for decrease in the moisture content will, of course, depend upon the sectional dimensions of the piece.

With respect to the moisture content representing the equilibrium value which will be attained upon long standing, it must be kept in mind that the percentage will vary according to the conditions of humidity under which the piece is used. Thus, as noted above, for the average conditions of humidity of the temperate climate, the equilibrium percentage will be from about 2% to about 3%. In exceedingly moist climates this equilibrium value will be higher, ranging up to about 6%, depending upon the average yearly humidity of the particular climate or region. In exceptionally dry regions the equilibrium value will, of course, be below the 2% to 3% range. Moreover, in instances where the piece must work under water the equilibrium value may be as high as 8%.

With the foregoing in mind, the conditions under which the piece is to be used should be kept in mind in determining the extent of moisture increase to be effected.

In certain cases, especially where articles are to be machined from relatively large pieces of nylon it is of advantage to subject the pieces to boiling in water prior to machining of the articles. Such boiling will effect partial strain relief and this has been found to greatly facilitate the machining of the articles, even though this treatment alone will not provide sufficient strain relief to achieve dimensional stability. The boiling will introduce some moisture into the piece and therefore when the articles cut from the piece are to be subsequently treated at high temperature (for instance, 450° F. to 475° F. in an oil bath), it is of importance that the material be again dried to remove moisture (either before or after the initial machining operation) prior to the subsequent high temperature treatment.

The treatments or techniques described above are highly effective in overcoming dimensional instability heretofore encountered either as a result of internal strain or as a result of moisture absorption or as a result of a combination of these factors.

When the several stages of treatment are utilized in the fabrication of machined parts, the application of the several treatments in the sequence fully discussed above has been found highly effective in producing such parts having greatly diminished tendency for the dimensions to change or distort upon aging or use than would be found in similar parts not so treated. Indeed, in some cases no noticeable changes occur in the treated pieces.

A few typical examples of treatments are given hereinbelow to further illustrate the invention.

EXAMPLES

Example I

Certain gears were made from polyhexamethylene adipamide. The specifications for these gears include the following:

Pitch diameter_____ 1.25"±.002.
Inside diameter_____ .25"±.001.
Hub on one side_____ .750"±.001 outside diameter.
Thickness of gear and hub. ⅜".

In making these gears polyhexamethylene adipamide rod of 1⅜" diameter was molded under pressure from previously dried flake or granular material having a moisture content slightly below 0.2%. The molded rod was heated in an oil bath up to 450° F. and held there for 15 minutes. The rod was then cooled to room temperature over a period of 2½ hours.

Gear blanks were then rough cut from this strain-relieved rod and the rough blanks were boiled in water until they attained a moisture content of approximately 2½% by weight.

The rough stabilized blanks were then finish machined to the desired specifications.

The resulting gears had greatly improved dimensional stability as compared with similar gears made from pressure molded rod of the same diameter but without the strain relieving and moisture treatments, the untreated gears manifesting erratic dimensional changes apparently resulting both from internal strain and change in moisture content.

Example II

Rollers of polyhexamethylene adipamide were made having an O. D. of .656±.001 and an I. D. of .125+.001—.000. These pieces were cut from ¾" rod which, after molding, had been slowly heated in oil up to 450° F., held at that temperature for 10 minutes, and cooled over a period of two hours before removal from the oil. The rod was then boiled for 24 hours in water to obtain an average moisture content between 2 and 3%, after which the rollers were machined from the treated rod. Parts made from this rod had not changed over the allowable tolerances when rechecked more than six months after they were first machined.

Example III

An aircraft hydraulic system required polyhexamethylene adipamide rings of the following specifications:

Inside diameter_____ 4.667" to 4.671".
Outside diameter_____ 5.121" to 5.125".
Thickness_____ .220"±.010".

Rings meeting these specifications were successfully produced according to the following:

A cylinder of appropriate size was first centrifugally cast and this cylinder was then boiled in water to effect some strain relief prior to machining. Slightly oversized rings were then rough cut from the cast cylinder, allowing about ⅛" excess stock on all dimensions. The rough machined rings were then dried to remove moisture and thereafter were heated in oil to a temperature between 450° F. and 475° F., the temperature remaining in this range for about 15 minutes.

The rough rings were then cooled by standing in air. They were thereafter boiled in water for about 20 to 30 hours until they showed a moisture take-up of about 4% to 5%. Thereafter the rough rings were dried in a hot air furnace at 140° F. to 170° F. for a period of about 20 hours, which reduced the moisture content to about 2½%.

The rings were then finish machined and showed good dimensional stability.

*Example IV*

Polyhexamethylene adipamide was dried to a moisture content below 0.20%. This material was melted and centrifugally cast to form a cylinder having 5¾″ outside diameter and ¾″ wall thickness.

The cylinder was placed in an oil bath at room temperature and over a period of about 70 minutes the temperature was raised to 450° F. This temperature was held for about 60 minutes and thereafter the oil bath was permitted to cool over a low flame, the flame finally being turned off after 1½ hours and the bath permitted to cool to room temperature. The cooling required about 90 minutes to reach 360° F. and a matter of several hours to reach room temperature.

Rings of about ¼″ in width were then cut from the cylinder and a saw cut was made in each in a radial plane through the ring at one point. The gaps from the saw cuts did not close or open, showing that internal strain in the pieces had been relieved.

In contrast with the foregoing, rings cut from molded cylinders which had not been heated and cooled as described, regularly showed considerable but erratic tendencies for saw cut gaps to either open or close, showing the presence of strain in the piece.

*Example V*

Dried polyhexamethylene adipamide was pressure molded to form a rod 1½″ in diameter. This rod was placed in an oil bath at room temperature and the temperature raised over a period of 30 minutes to 450° F. The temperature was retained at or a little above 450° F. for 15 minutes. The oil bath was then permitted to cool, the rate of heat dissipation being reduced by wrapping the oil container in asbestos. Several hours were required for the temperature to drop below about 200° F.

Thin walled rings were cut from the treated rod and a saw cut was then made in each in a radial plane through the ring. The saw cut gaps remained at their original widths.

In contrast similar rings made from similar rods not subjected to the heating and cooling as described displayed tendencies to open or close the saw cut gaps.

As mentioned above, when a final machining operation is utilized, such operation would ordinarily be performed on the piece subsequent to the treatment to increase the moisture content. This sequence is advantageous when a very high degree of accuracy is necessary because the moisture treatment involves a swelling of the piece, which swelling, moreover, is not always uniform in all directions. Thus, if the moisture treatment were applied after the piece had been carefully finish machined to the exact desired size, some departure from this size would probably take place during the moisture treatment. However, it is not always necessary to apply a finish machining operation. Thus, for example, in some applications it is desirable to adhere to the following sequence of process steps: Forming an article by solidifying molten polyamide; slowly cooling said article to a temperature at least as low as the boiling point of water; machining a piece from the article, although not to the final finished size; and thereafter increasing the moisture content of the machined piece to the extent desired. For instance, a round rod 1″ in diameter may be formed, heated, and slowly cooled. Then this 1″ rod may be machined to a size slightly smaller than 1″, after which the moisture treatment may be carried out. The swelling which would take place during the moisture treatment would bring the size of the piece back up to substantially 1″ and it could thereafter be utilized even without performing a finish machining operation.

For many applications, for instance with pieces in which the average cross-sectional dimension is not very large, it is sufficient to effect the following steps: Form a piece, heat it, slowly cool it to relieve internal strains, add moisture to the piece until the desired percentage moisture content is reached, and thereafter machine the piece as required by a particular application. In production runs following substantially the sequence just outlined, and where the pieces are small or where more than minimum dimensional tolerance variations are permissible, it is not always necessary to take the moisture content to a point above that ultimately desired and then dry the piece until the moisture content falls to the desired level. When a series of substantially standard pieces are produced, it is often sufficient to boil the pieces for a period of time found to be satisfactory for most of the pieces and, if a weight test of the individual pieces indicates that the moisture content is too high in some of them, these pieces may be dried. This drying step is not always used however if the weighing indicates that the correct amount of water has been added to a piece.

In certain applications it is desirable to effect two slow cooling operations, one after forming a piece and prior to a rough machining operation and one after the rough machined part has been re-heated, the second slow cooling operation being preferably followed by a finish machining operation. Thus it may at times be desirable to follow this sequence: Slowly cool a formed piece from a temperature between 400° F. and 500° F., rough machine a part from the piece, heat the rough machined part to a temperature between 400° F. and 500° F., slowly cool the rough machined part, and thereafter it may be desirable to re-machine or finish machine the part. When moisture treatment is to be utilized with a double heat treating cycle such as that just outlined, the moisture treatment will follow the second slow cooling operation, for instance just before a final machining if especial accuracy is desired, or following a final machining operation. This sequence of treatments is illustrated in Figure 2 of the drawing.

The above described double heat treating sequence is advantageous when it is necessary to perform a rough machining operation which removes a substantial quantity of material and/or effects a substantial change in the shape of the piece. It has been found that, even though slow cooling of a formed piece removes a substantial part of the internal strain, nevertheless a rough machining operation of the kind mentioned upsets the balance or equilibrium of the residual internal strains and thereby increases the likelihood that the piece will gradually distort after the rough machining. The second heat treating operation serves to substantially reduce and restore equilibrium to the internal strains remaining in the rough machined part. By way of illustration it is mentioned that it may be desirable to start with a blank in the form of a hollow cylinder and machine therefrom a collar having a flange at one end extending a considerable distance. In such a situation, even though the blank was slowly cooled from a high temperature to minimize internal strain, it would be advantageous to re-heat and slowly cool the flanged collar after the rough machining in order to avoid distortion as a result of the imbalance of internal strain present after the rough machining operation. However, after the second heat treatment, the flanged collar would substantially hold its shape, even if subsequent additional operations were performed on it, for instance finish machining and/or moisture stabilization.

This application is a continuation in part of our prior application Serial Number 197,838, now abandoned.

We claim:

1. In the manufacture of an article of improved dimensional stability from polyhexamethylene adipamide, the method which includes molding an article from the polyamide while the polyamide has a moisture content of less than 0.5% by weight, heating the molded article to a temperature within a range of from 450° to 475° F., slowly cooling said article to a temperature at least as low as the boiling point of water, rough machining the article, thereafter increasing the moisture content of the article to a point above the equilibrium value for the conditions of humidity under which the article is to be used, thereafter reducing the moisture content of the article to a moisture content approximating the equilibrium moisture content for the conditions under which the article is to be used, and thereafter finish machining the article.

2. In the manufacture of a machined part of improved dimensional stability from polyhexamethylene adipamide, the method which includes molding a piece from the polyamide, heating the molded piece to a temperature between 400° F. and 500° F., cooling the piece to a temperature at least as low as 200° F., the rate of cooling being sufficiently low to provide for cooling down to 200° F. in not less than 30 minutes, rough machining the desired part from the cooled piece, increasing the moisture content of the rough machined part to a point above 3% by weight of the part, reducing the moisture content of the part to a value between 2% and 3% by weight, and thereafter finish machining the part.

3. In the manufacture of a machined article from polyhexamethylene adipamide, the method which includes molding a piece from the polyamide, boiling the molded piece in water, machining the article from the piece, drying the machined article, and heating the machined article to a temperature between 400° F. and 500° F. while the article is substantially dry.

4. In the manufacture of a machined part of improved dimensional stability from polyhexamethylene adipamide, the method which includes forming a piece by solidifying molten polyamide, rough machining the desired part from the piece, heating the rough machined part to a temperature between 400° F. and 500° F., cooling the rough machined part to a temperature at least as low as 200° F., the rate of cooling being sufficiently low to provide for cooling down to 200° F. in not less than 30 minutes, increasing the moisture content of the rough machined part to a point above 3% by weight of the part, reducing the moisture content of the part to a value between 2 and 3% by weight, and thereafter finish machining the part.

5. In the manufacture of a machined part of improved dimensional stability from polyhexamethylene adipamide, the method which includes forming a piece by solidifying molten polyamide, rough machining the desired part from the piece, heating the rough machined part to a temperature between 400° F. and 500° F., cooling the rough machined part to a temperature at least as low as 200° F., the rate of cooling being sufficiently low to provide for cooling down to 200° F. in not less than 30 minutes, and thereafter finish machining the part.

6. In the manufacture of an article of improved dimensional stability from polyhexamethylene adipamide, the method which includes molding an article from the polyamide while the polyamide has a moisture content of less than 0.5% by weight, slowly cooling said article from a temperature between 400° F. and 500° F. to a temperature at least as low as the boiling point of water, rough machining the article, re-heating the rough machined article to a temperature between 400° F. and 500° F., slowly cooling the re-heated article to a temperature at least as low as the boiling point of water, increasing the moisture content of the article to a point approximating the equilibrium value for the conditions of humidity under which the article is to be used, and finish machining the article.

7. In the manufacture of a machined part of improved dimensional stability from polyhexamethylene adipamide, the method which includes forming a piece by solidifying molten polyamide while at a moisture content below 0.5%, heat treating the piece by heating it while at a moisture content below 0.5% to a temperature between 400° F. and 500° F. and cooling it to a temperature at least as low as 200° F., the rate of cooling being sufficiently low to provide for cooling down to 200° F. in not less than 30 minutes, placing the heat treated piece in a moist environment at elevated temperature to increase the moisture content thereof at an accelerated rate as compared with exposure of the piece to atmospheric conditions, and thereafter machining the piece to form a part of desired dimensions.

References Cited in the file of this patent

UNITED STATES PATENTS

| | | |
|---|---|---|
| 2,137,235 | Carothers | Nov. 22, 1938 |
| 2,352,725 | Markwood | July 4, 1944 |
| 2,372,630 | Smith | Mar. 27, 1945 |
| 2,373,093 | Baker | Apr. 10, 1945 |
| 2,386,976 | Putnam | Oct. 16, 1945 |

UNITED STATES PATENT OFFICE

CERTIFICATE OF CORRECTION

Patent No. 2,808,622                                                October 8, 1957

Louis L. Stott et al.

It is hereby certified that error appears in the printed specification of the above numbered patent requiring correction and that the said Letters Patent should read as corrected below.

Column 8, line 67, after "Serial Number 197,838," insert --filed November 27, 1950,--.

Signed and sealed this 14th day of January 1958.

(SEAL)
Attest:
KARL H. AXLINE

Attesting Officer

ROBERT C. WATSON
                                                                    Commissioner of Patents